Jan. 2, 1962 R. E. CARBERT ET AL 3,015,374
HYDRAULIC DERRICK
Filed May 4, 1956 5 Sheets-Sheet 1

INVENTORS
RALPH E. CARBERT
ARNE M BLOMQUIST
RAYMOND L. KENNEDY
BY Williamson, Schroeder,
Adams + Meyers.
ATTORNEYS Jan. 2, 1962 R. E. CARBERT ET AL 3,015,374
HYDRAULIC DERRICK
Filed May 4, 1956 5 Sheets-Sheet 3

INVENTORS
RALPH E. CARBERT
ARNE M. BLOMQUIST
RAYMOND L. KENNEDY
BY
Williamson, Schroeder,
Adams + Meyers
ATTORNEYS Jan. 2, 1962 R. E. CARBERT ET AL 3,015,374
HYDRAULIC DERRICK Filed May 4, 1956 5 Sheets-Sheet 5

INVENTORS
RALPH E. CARBERT
ARNE M. BLOMQUIST
RAYMOND L. KENNEDY
BY
Williamson, Schroeder,
Adams + Meyers
ATTORNEYS

United States Patent Office 3,015,374
Patented Jan. 2, 1962

3,015,374
HYDRAULIC DERRICK
Ralph E. Carbert, Arne M. Blomquist, and Raymond L. Kennedy, Minneapolis, Minn., assignors to Tel-E-Lect Products Inc., Minneapolis, Minn., a corporation of Minnesota
Filed May 4, 1956, Ser. No. 582,730
12 Claims. (Cl. 189—11)

This invention relates to derricks. More particularly, it relates to derricks adapted to be mounted on the forward or rearward end of the vehicle for swinging movement outwardly of the vehicle and inwardly to an overhanging horizontal position relative to the vehicle.

In types of work wherein derricks mounted upon vehicles are required, such as in public utility construction and repair work, it is almost imperatively demanded today that the derrick be shiftable from operative position to an out-of-way storage position. The nature of the vehicles and highways with low overhead constructions are such that the preferred storage position has come to be recognized as that wherein the derrick lies substantially horizontally in an overhanging relation to the cab and body of the vehicle. This position has a number of drawbacks, however, in that there is the problem of how to quickly, easily and safely shift the derrick from an outwardly and upwardly extending operative position to a horizontal, overhanging, inoperative or storage position, and vice versa. In addition, it is considered highly desirable, if not imperative, that the ends of the derrick not extend appreciably beyond the confines of the vehicle.

A large number of derricks and derrick mountings have been designed with a view toward attaining one or more of these goals. Many are of complicated and expensive design and are cumbersome to use. Some utilize hinged or foldable legs on the derrick to avoid outwardly extending members when in storage position but such a derrick is considerably weaker than one having rigid legs. Others utilize rigid legs but these legs protrude outwardly beyond the peripheral limits of the vehicle. Many utilize pivot means at both the lower ends of the legs and at the medial portions of the legs but these are often dangerous to use and require considerable time and effort in moving the derrick from operative to storage position and vice versa and also require manual movement of locking devices at various points to switch the points of pivot. All of them have heretofore failed to provide a derrick overcoming all of these disadvantages. Our derrick is designed to eliminate all of these disadvantages.

It is a general object of our invention to provide a novel and improved derrick and mounting therefor.

A more specific object is to provide a novel and improved derrick and mounting therefor of simple construction and operation.

Another object is to provide a novel and improved derrick and mounting therefor which can be operated more simply, efficiently, safely, and with less effort.

Another object is to provide a novel and improved derrick and mounting therefor which can be more easily and readily controlled and manipulated, as desired.

Another object is to provide a novel and improved derrick which can be moved between operative and storage position and operated from within the cab of the vehicle.

Another object is to provide a novel and improved derrick which is constructed to have maximum strength, and yet can be stored simply and easily within the confines of the vehicle.

Another object is to provide an improved derrick having increased functional capability.

Another object is to provide a novel and improved hydraulic derrick constructed to permit the hydraulic cylinder to be detached from the spindle bar and utilized as a ground supported brace leg in combination with a winch.

Another object is to provide a novel and improved derrick constructed to permit the derrick, when in inoperative position, to be shifted longitudinally of the vehicle.

Another object is to provide a novel and improved derrick designed to pivot about its medial portions while moving from inoperative stored position toward operative position and to automatically detach its medial portions from the derrick mounting while automatically pivotally locking its lower end portions to the derrick mounting at a lower point.

Another object is to provide a novel and improved derrick designed so that, in moving from operative to inoperative stored position, it will pivot about its lower end portions and then automatically detach its lower end portions from its mounting while automatically pivotally locking its medial portions to its mounting at a higher elevation to permit the derrick to be swung to horizontal overhanging position relative to the vehicle.

Another object is to provide a novel and improved derrick having the features outlined in the immediately preceding two paragraphs and being shiftably mounted for forward and rearward sliding movement relative to the vehicle when in stored position.

These and other objects and advantages of our invention will more fully appear from the following description made in connection with the accompanying drawings, wherein like reference characters refer to similar parts throughout the several views, and in which.

Figure 1:
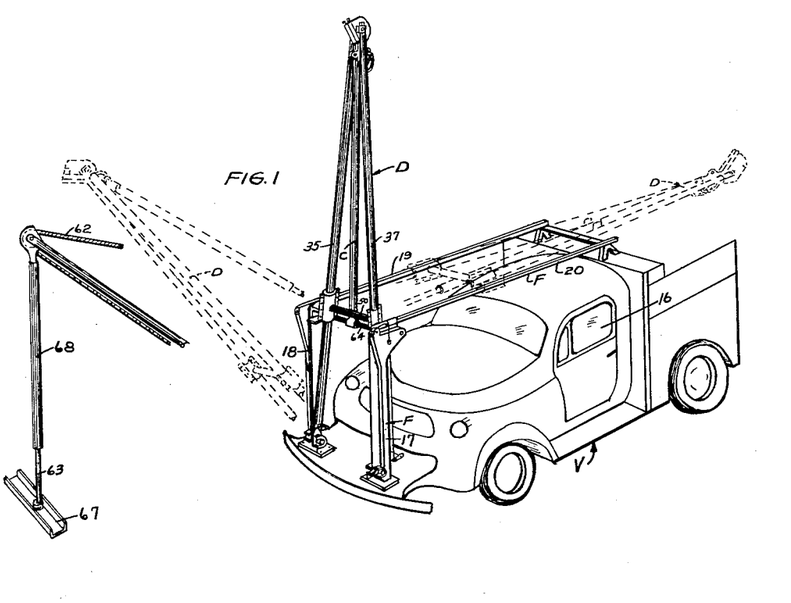
FIG. 1 is a perspective view of one embodiment of our invention mounted on the front end of a utility truck and showing the derrick in operative and storage position in broken lines and at an intermediate position in solid lines.
Figures 2, 11, 12:
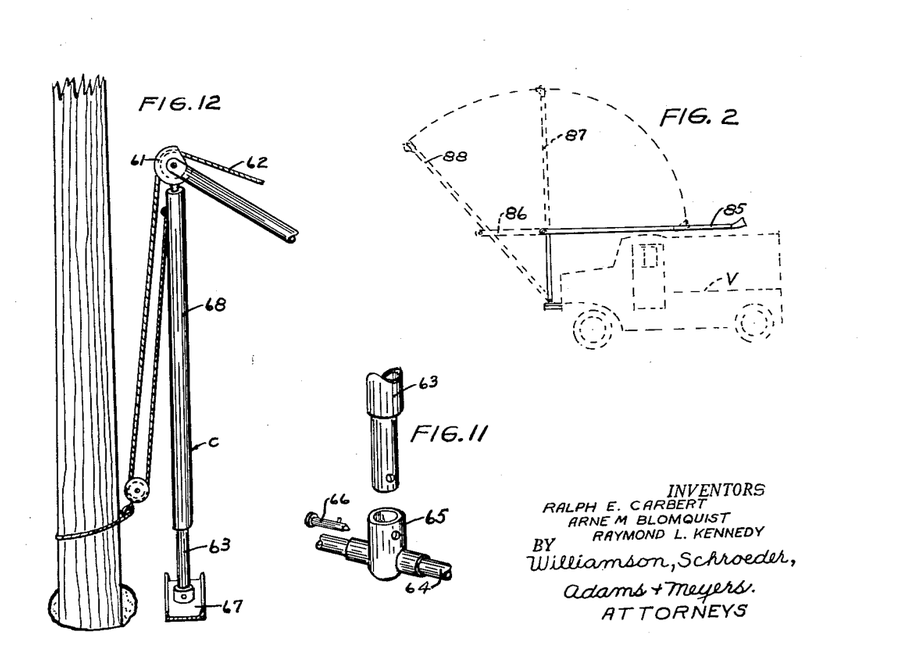
FIG. 2 is a diagrammatic view showing diagrammatically the orientation of the derrick while moving between operative and storage positions.
FIG. 11 is an exploded view showing the construction which permits the hydraulic cylinder to be detached from the spindle bar and to be utilized as an upright brace member in combination with a winch.
FIG. 12 is a side elevational view of the outer end portion of the derrick with the hydraulic cylinder detached from the spindle bar and being used as an upright brace member in combination with a winch to pull a pole from the ground or lift a heavy object.
Figures 3, 4, 5, 6, 7:
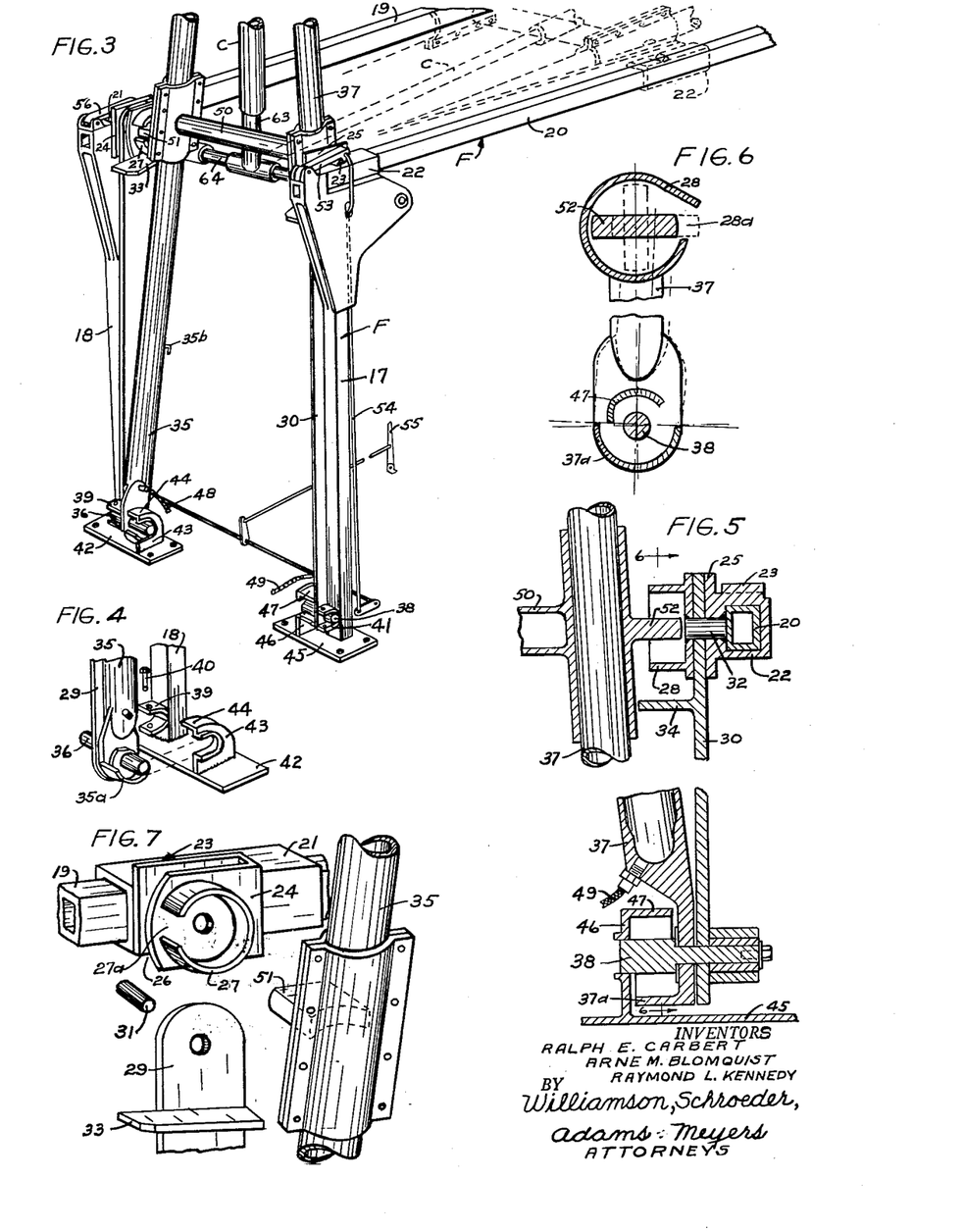
FIG. 3 is a perspective view on an enlarged scale of the lower end and medial portions of the derrick and the derrick mounting.
FIG. 4 is a perspective view on an even larger scale of the lower end portion of one of the legs of the derrick and of the mounting frame immediately before engagement of the former by the latter.
FIG. 5 is a vertical sectional view on an enlarged scale of the automatic locking and unlocking pivot means at the medial portions and lower end portions of the derrick when the derrick is oriented vertically, intermediate portions of the derrick and mounting frame having been omitted.
FIG. 6 is a vertical sectional view taken along line 6—6 of FIG. 5 and showing the automatic locking and unlocking pivot means at the medial portions of the derrick and at the lower end portions of the derrick with the interlocking portions being shown in locked and unlocked positions, the former position being shown in broken lines.
FIG. 7 is an exploded view on an enlarged scale of the automatically locking and unlocking pivot means at the top of the mounting frame and medial portions of the derrick.

One embodiment of our invention may include, as shown in FIGS. 1–14, a vehicle indicated generally as V, having a cab 16 and adapted to have a derrick mounted upon either the forward or the rearward end thereof. As shown in FIG. 1, the derrick may be mounted upon the forward end of the vehicle so that the derrick will move to a substantially horizontal overhanging position relative to the vehicle when in storage position, as shown in broken lines in that figure. The mounting frame for the derrick is indicated generally as F and the derrick itself is indicated generally as D. It will be noted that the frame F has a pair of vertically extending portions 17 and 18 which are rigidly secured to the frame of the vehicle V at the forward end thereof. The frame F also includes a pair of laterally spaced rail members 19 and 20 which extend longitudinally of the vehicle and above the cab thereof. These two rails 19 and 20 are tubular in construction as best shown in FIG. 5 and FIG. 7. They are rigidly secured to the upper ends of the upstanding portions 17 and 18 of the frame and they constitute a horizontally extending portion of the frame which extends longitudinally of the vehicle.

Mounted on the rails 19 and 20 for forward and rearward sliding movement relative thereto, is a pair of sleeve members 21 and 22. Each of these sleeves carries an upstanding catch element such as 23 upon its upper surface. Each of these sleeves 21 and 22 also has a U-shaped bracket member such as 24 and 25 extending inwardly from its inner side, the bracket opening outwardly from the vehicle and having centrally disposed and opposed apertures such as 26 formed therethrough. Extending inwardly from the inner leg of each of the U-shaped members is an annular flange such as 27 or 28. Each of the flanges is slotted and the slot faces outwardly from the vehicle, as best shown in FIG. 7, the slots being designated as 27a and 28a.

Pivotally mounted within the brackets 24 and 25 is a pair of elongated link members 29 and 30, these links being formed of flat plate-like metal and mounted in the brackets upon pivot pins 31 and 32, each of which is received within the opposed apertures 26 and is welded at its opposite ends to the legs of the bracket. The link 29 carries an angled guide iron 33 and the link 30 carries a similar guide iron 34, each of the guide irons extending inwardly toward each other from the inner sides of the links and being angled outwardly as best shown in FIG. 7.

The lower end of the link 29 is pivotally connected to the lower end of the derrick leg 35 by a pin 36 which extends outwardly beyond the outer sides of these two members as shown in FIG. 4. The lower end of link 30 is pivotally connected to the lower end portion of derrick leg 37 by a pin 38 which similarly extends laterally beyond these two members from both sides as best shown in FIG. 5. The lower ends of the derrick legs 35 and 37 are flattened to facilitate the relative pivotal movement between these legs and their attached links 29 and 30. Their flattened lower ends each carry one of a pair of arcuately shaped inwardly extending flanges 35a and 37a, the construction of which can best be seen in FIG. 4.

Mounted on the lower end of the upright member 18 of the frame and facing outwardly is a bracket 39 which is adapted to receive the outer end of the pin 36 and has vertically aligned apertures to receive a locking pin 40 which may be utilized on rare occasions as will be hereinafter described. The upright member 17 carries a similar bracket 41 at its lower end adapted to receive the outer end of the pin 38 and having vertically aligned apertures adapted to receive a locking pin (not shown) similar to pin 40.

Mounted on the base plate 42 of the frame F inwardly of the member 18 is an arcuately shaped slotted channel member 43 which has an inwardly extending arcuate flange 44, the shape of which is best shown in FIG. 6. Mounted on the base plate 45 of the frame F is a similarly shaped channel member 46 having a similar arcuately shaped flange 47. These channel members and the arcuately shaped flanges 35a and 37a together form automatic locking and unlocking pivot means for the lower end portions of the derrick D as will be more clearly seen hereinafter.

One of the legs 35 carries a cable anchoring hook 35b. These legs 35 and 37 of the derrick are hollow and carry hydraulic fluid throughout their length which is supplied through lines 48 and 49 respectively. The medial portions of these legs are connected by a cross bar 50. Extending laterally from leg 35 opposite the cross bar 50 is a tongue 51 which is slightly thinner than the slot 27a of the annular member 27 and is received within the member 27 in a manner as shown in FIG. 6 when the derrick is vertical, as shown in FIG. 3. Extending laterally from leg 37 is an oppositely disposed tongue 52 which is similarly received within annular member 28. These tongues and annular members together constitute automatic locking and unlocking pivot means for the medial portions of the derrick D as will be more clearly seen hereinafter.

Pivotally mounted atop the outer end of the rail 20 in position to engage catch member 23 is latch element 53 as shown in FIG. 3. This latch element 53 is controlled by linkage 54 actuated by a hand lever 55 within the cab 16. A similar latch element 56 is similarly mounted upon rail 19 in position to engage the corresponding catch member when the sleeves 21 and 22 are at their outermost positions on their respective rails. The latch element 56 is connected to the linkage 54 and controlled thereby.

Figure 8:
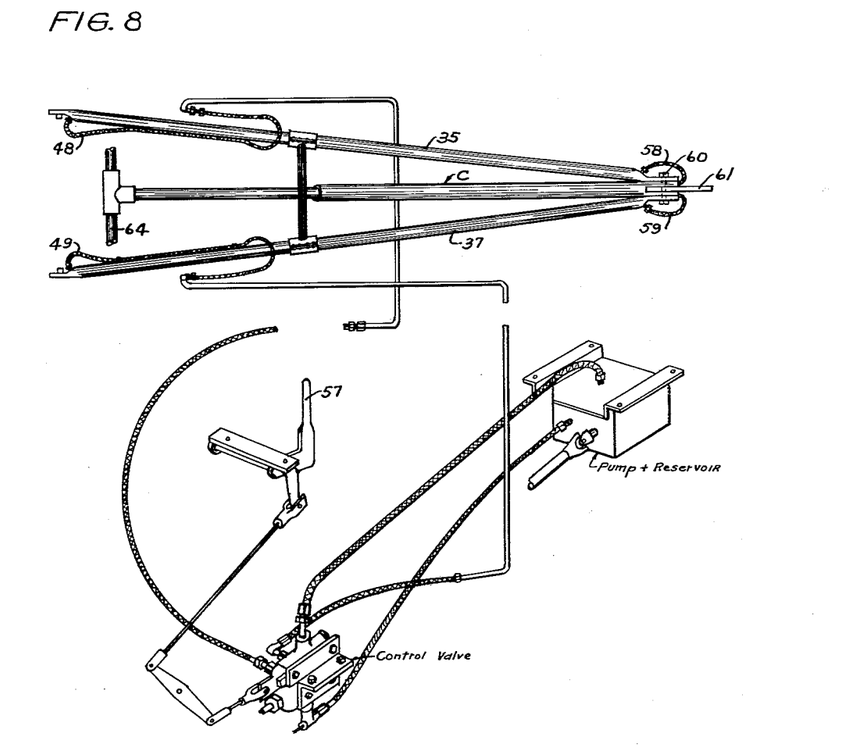
FIG. 8 is a plan view of the derrick in stored position with the hydraulic system diagrammatically illustrated.

Reference to FIG. 8 will show the hydraulic connections utilized to control the flow of hydraulic fluid through the derrick legs 35 and 37 by means of a lever 57 which is disposed within the cab 16. Since the means for supplying and controlling the flow of hydraulic fluid is well known in the art and not a critical part of the invention disclosed herein, no further description is deemed necessary other than to say that the mechanism disclosed in FIG. 8 serves to alternately force fluid through one of the lines 48 and 49 and thus through the legs 35 and 37. At the outer ends of these legs lines 58 and 59 carry the fluid into the interior of the hydraulic cylinder C which is pivotally mounted between the outer ends of these legs 35 and 37 by a bolt 60. A sheave 61 is mounted on the outer end of the cylinder C to accommodate a cable 62 which is controlled by a winch (not shown) mounted on the vehicle V in the conventional manner.

The inner end of the piston rod 63 of the cylinder C is detachably connected to a spindle bar 64 which is rigidly mounted on the frame F and extends transversely thereof below and inwardly of annular members 27 and 28 when the sleeves 21 and 22 are in their outermost positions as shown in FIG. 3. The exact nature of the connection is best shown in FIG. 11 wherein there is shown a socket member 65 mounted on the spindle bar to receive therein the reduced end of the piston rod 63 and secured thereto by a pin 66. The reduced end of the piston rod 63 is adapted to be connected in the same manner to a foot plate 67 after having been detached from spindle bar 64 as shown in FIG. 1 and FIG. 12. To accomplish the detachment, the outer end of cable 62 is hooked upon cable anchor 35b and the derrick is supported and then lowered by the action of the winch and cable until the full weight of the derrick is borne by the vertically extending piston rod 63 as shown in FIGS. 1 and 12.

Figure 9:
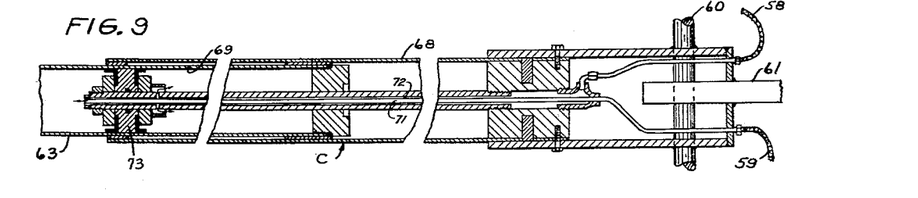
FIG. 9 is a longitudinal sectional view on an enlarged scale of the hydraulic cylinder carried by the outer end portion of the derrick.

The hydraulic cylinder C is a two-way acting cylinder and its inner construction is best seen in FIG. 9. It includes an outer guiding tube 68 within which the cylinder tube 69 extends. A hollow shaft 70 extends longitudinally of the cylinder and within this shaft is a fluid line 71 within a larger fluid line 72. The fluid line 71 extends throughout the length of the shaft 70 and discharges below the piston 73. The outer line 72 discharges just above the piston 73 as indicated by the arrows in FIG. 9. By alternately injecting fluid through the lines 71 and 72, the upward and downward movement of the piston 73 and piston rod 63 can be controlled.

Figure 10:
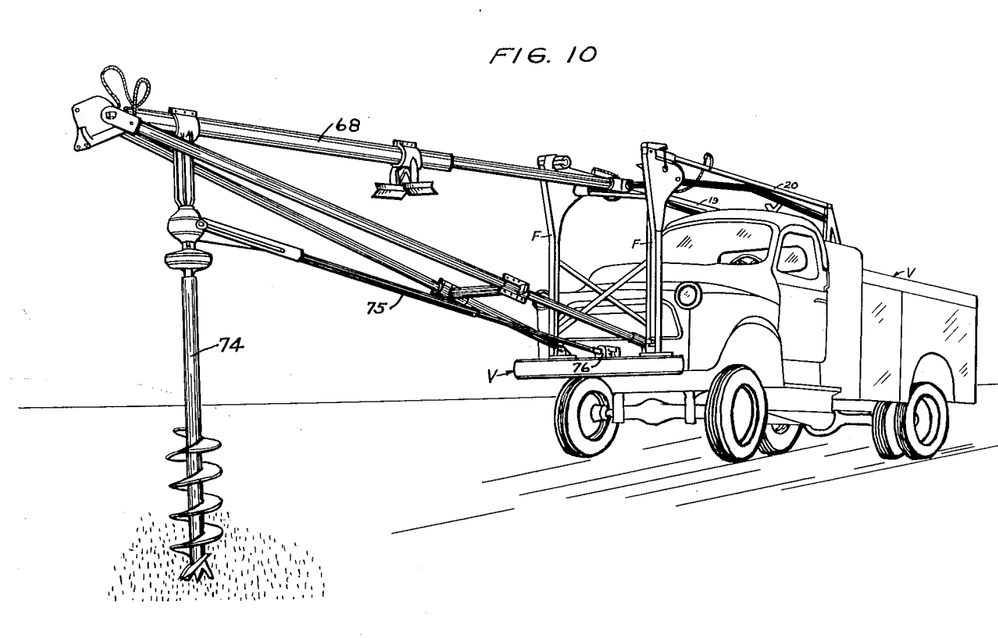
FIG. 10 is a perspective view showing the derrick being utilized to bring the entire weight of the front end of the truck to bear downwardly upon a drilling auger.

FIG. 10 shows our derrick utilized to support a drilling auger 74 mounted on the guiding tube 68 and driven by an extensible drive shaft 75 connected to the power takeoff 76 of the vehicle V.

Figure 13:
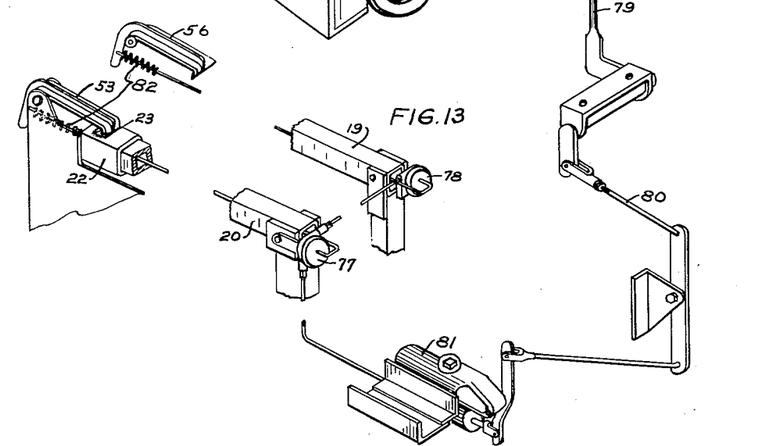
FIG. 13 is a perspective view showing the hydraulic locking means for locking the shiftable pivot means at the medial portion of the derrick and upper end portion of the frame.

FIG. 13 shows hydraulic control means for controlling the positions of the sleeves 21 and 22 by hydraulically actuating the latch elements 53 and 56. The actuating cylinders 77 and 78 are connected by linkage extending within the rails 19 and 20 to the latch elements. The flow of the fluid is controlled by operation of the hand lever 79 (within the cab 16) which is connected by linkage 80 to the hydraulic master cylinder 81. The latch elements are each urged to locking position by springs such as return spring 82.

Figure 14:
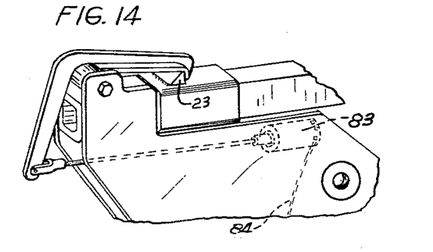
FIG. 14 is a perspective view showing the electrical locking means for locking the shiftable pivot means mounted at the upper end of the frame and at the medial portion of the derrick.

FIG. 14 shows electrical control means for actuating the latch elements. Each latch is connected to a solenoid 83 which is controlled by an electric circuit carried by line 84 which leads to a switch in the cab 16.

The operation of our derrick is unusually simple and safe. For the sake of convenience, the operation of the derrick will be described from the stored inoperative position, shown in FIG. 2 in solid lines, and indicated by the numeral 85. When in this position, the sleeves 21 and 22 are in the broken line position shown in FIG. 1 and the entire derrick lies in overhanging relation to the vehicle V and within the peripheral confines thereof, as best shown in FIG. 2. In other words, the lower end portions of the derrick do not extend outwardly beyond a vertical plane at the front of the truck.

In order to move the derrick to operative position, the first step which is taken is to shorten the hydraulic cylinder C so as to draw the entire derrick longitudinally of the vehicle V to a position where the sleeves 21 and 22 will be engaged by the latch elements 53 and 56. As the sleeves are forced toward the outer end of the rails 19 and 20, the catch elements 23 cam the latch elements 53 and 56 upwardly until the latter slide over the catch elements and lock the sleeves 21 and 22 in the extreme position shown in solid lines in FIG. 1. When the sleeves 21 and 22 are in this position, the lower end portion of the derrick D extends outwardly beyond the confines of the vehicle, as best shown in FIG. 2, the lower end portions of the derrick being indicated by the numeral 86 when in that position.

As soon as the latch elements 56 and 53 engage the catch elements 23 and securely lock the sleeves in that position, the direction of flow of the fluid in the hydraulic cylinder is reversed by the operator so that the hydraulic cylinder will commence to extend, whereupon the outer end portion of the derrick will be swung upwardly to the vertical position shown in solid lines in FIG. 1 and indicated in broken lines in FIG. 2 as the intermediate position and designated by the numeral 87.

While swinging from the position 86 to the intermediate position 87, the medial portions of the derrick pivot adjacent the sleeves 21 and 22 within the automatic interlocking cooperative pivot means hereinbefore described and comprised of the annular members 27 and 28 within which the tongues 51 and 52 pivot.

As the lower end portions of the derrick approach the lower end of the upright members 17 and 18 of the frame, the arcuate members 35a and 37a will be oriented as shown in FIG. 4. Immediately thereafter the lower end portions will be engaged by the arcuate channel members 43 and 46 with the pins 36 and 38 being engaged by the channel members 43 and 46. FIG. 6 shows the relative positions of the interlocking members both at the lower end portions of the derrick and at the medial end portions of the derrick when the derrick is in truly vertical position. It will be noted that the tongue 51 is oriented horizontally so that the medial portions of the derrick are no longer locked to the sleeves 21 and 22 but are free to swing outwardly relative to the frame F. The lower end portions of the derrick are about to interlock with the arcuate portions 35a and 37a and as the outward swinging movement of the upper end of the derrick continues, the tongues 51 and 52 will swing outwardly to the broken line position shown in FIG. 6 and the flanges 35a and 37a will swing behind the arcuate members 44 and 46 so as to positively interlock the lower end portions of the derrick with the frame at these points. Thus it can be seen that, as the medial portions of the derrick are automatically unlocked from the frame F, the lower end portions of the derrick are automatically interlocked to the frame so as to pivot relative thereto.

When the derrick reaches the vertical position shown in solid lines in FIG. 1, the direction of flow of the hydraulic fluid is continued by the operator in the cab whereupon the hydraulic cylinder will continue to lengthen and swing the derrick to the broken line position shown in FIG. 1. The elevation of the derrick can be positively controlled through manipulation of the hydraulic system so that the derrick may be lowered or raised at will. The operative position, just described, is indicated by the numeral 88 in FIG. 2.

When it is desired to move the derrick to stored position, the operator merely controls the hydraulic fluid system so as to cause the hydraulic cylinder to shorten whereupon the derrick will swing upwardly to the vertical position shown in solid lines in FIG. 1. As this position is reached, the tongues 51 and 52 will enter the annular members 27 and 28, the derrick being guided into proper position by the guide plates 33 and 34. As the tongues 51 and 52 enter the slots of the annular members 27 and 28, they move inwardly until they engage the rear wall of these members. When this is done, the rearward extent of pivotal movement about the lower end portions of the derrick has been reached but, by reference to FIG. 6, it can be seen that the lower end portions have already been unlocked from the frame F so that the lower end portions will swing outwardly to the position shown in FIG. 4. During the movement of the lower end portions to the position shown in FIG. 4, the tongues 51 and 52 are pivoting toward the vertical broken line position shown in FIG. 6 and immediately upon the pivoting of these tongue members, they interlock the medial portions of the derrick with the annular members 27 and 28 for relative pivotal movement.

When the vertical position shown in solid lines in FIG. 1 and indicated by the numeral 87 in FIG. 2 has been reached, the operator continues the flow of the hydraulic fluid so as to cause the cylinder to shorten more whereupon the inward swinging movement of the upper end portion of the derrick will continue and the medial portions of the derrick will pivot at the upper ends of the members 17 and 18 of the frame, the pivotal movement being accomplished through the cooperative action of the tongues 51 and 52 and the annular members 27 and 28. The operator continues to shorten the hydraulic cylinder until the derrick reaches the horizontal position indicated by the numeral 86 in FIG. 2. When this position is reached, the operator operates next the manual linkage mechanism which controls the latch elements 53 and 56 through the use of the lever 55 so as to raise these elements and thereby free the sleeves 21 and 22 for sliding movement relative to the rails 19 and 20. When this has been done, the direction of flow of the fluid is reversed and the cylinder C is lengthened whereupon the sleeves 21 and 22 will slide away from the members 17 and 18 of the frame to the broken line position shown in FIGS. 1 and 3 and the entire derrick will shift toward the rear of the vehicle until it lies within the vertical confines of the vehicle, as shown in solid lines in FIG. 2.

Figure 15:
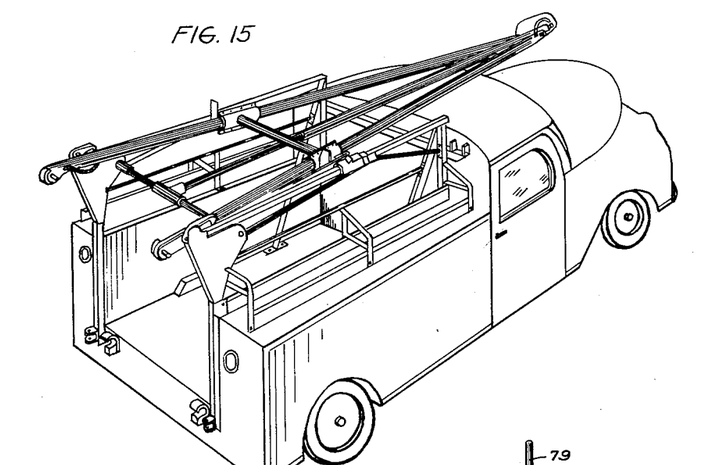
FIG. 15 is a perspective view of the derrick mounted on the rear end portion of a utility truck and swinging forward to horizontally overhanging position relative to the body of the truck when in stored position.

It will be readily understood that the latch elements 53 and 56 can be controlled equally as easily through the use of the hydraulic control means shown in FIG. 13, the latch elements being lifted through manipulation of the hand lever 79. Similarly, these latch elements can be controlled by merely pressing a switch in the cab 16 to actuate the solenoids 83 if the electrical control means shown in FIG. 14 is utilized. FIG. 15 shows substantially the identical structure mounted upon the rear end of a vehicle rather than the forward end and merely illustrates that our derrick and derrick mounting is readily adapted to be utilized at either end of the vehicle, the only difference being that the derrick is mounted to swing forwardly relative to the vehicle to move to stored position instead of rearwardly to move to stored position. It will be readily appreciated of course that, in this event, the owner may prefer to mount the control levers and other control elements at the rear end of the truck adjacent the lower end portions of the derrick when the latter are in pivoting position on the frame so that the operation can be readily viewed by the operator as he manipulates the derrick.

Thus it can be seen that we have provided a derrick which can be swung from operative position to storage position and back again without the need for inserting and removing locking pins and through simple manipulation of levers without the operator leaving the cab of the vehicle. It will be noted that the medial portions and the lower end portions of the derrick automatically lock and unlock to the frame and this locking and unlocking operation is so correlated that, as the one pivot means locks the associated portion of the derrick to the frame, the other pivot means unlocks its associated portion relative to the frame and vice versa. Thus the entire locking and unlocking relation is accomplished automatically and the derrick is at all times under complete control of the operator through the simple manipulation of the hydraulic fluid system.

The only time the locking pin 40 need be used is when the derrick is in vertical position and carries a load thereon. When this is done, the pin 41 is inserted else the flanges 35a and 37a might disengage the channel members 43 and 46. However, the pin 40 is essentially a precautionary safety element and is not ordinarily used in the operation of the derrick.

FIG. 10 illustrates one of the added advantages of our derrick. In this figure, the use of a derrick is shown to force the auger 74 into the ground even though the ground may be frozen or be of such a nature as to make it ordinarily impossible for the auger 74 to enter the same. FIG. 10 shows the hydraulic cylinder 68 extended sufficiently so as to lift the forward end of the truck completely off the ground, thereby bringing the weight of the forward end to bear downwardly upon the auger 74. If the outer end portion of the derrick is desired for use in order to accomplish a lifting action, the cylinder 68 can be shortened to accomplish the lifting action desired.

When it is desired to utilize the cylinder C as an upright brace member, the derrick is moved to vertical position and the cable 62 is connected to the cable anchor 35b so that the derrick is supported by the cable and winch and the pin 66 is then removed so that the reduced end portion of the piston rod 63 can be removed from the socket 65 by shortening the cylinder. The foot plate 67 is then attached to the reduced end of the piston rod 63 and placed upon the ground as shown in FIGS. 1 and 12. The cable can then be utilized to attach a telephone pole or other object desired to be lifted to the derrick and the object can be lifted by either extending the cylinder C or operating the winch to shorten the cable 62.

Thus it can be seen that we have provided a derrick which can be operated very simply, efficiently and safely and with a minimum of effort. Our derrick is easily controlled and manipulated by a single operator and he can perform this control and manipulation without being in a dangerous position and simply by adjusting the levers which control the hydraulic system connected with the hydraulic cylinder C. It should be noted that our derrick can be shifted in this manner from storage to operative position and back again to storage position without the need for any individual even touching the derrick, the point of pivot automatically shifting from the lower end portion of the derrick to the medial portion of the derrick when the same is required. Furthermore, the derrick can be slid longitudinally of the vehicle, so that when the derrick is in stored position, no portion thereof extends beyond the vertical confines of the vehicle. This can be accomplished even though the legs of the derrick are rigid and are not hinged.

It will of course be understood that various changes may be made in the form, details, arrangement and proportions of the various parts without departure from the scope of the present invention which, generally stated, consists in the matter shown and described and set forth in the appended claims.

What is claimed is:

1. A derrick assembly comprising a frame adapted to be mounted upon one end of a vehicle, a derrick carried by said frame for swinging movement in a vertical plane and having upper and lower end portions and medial portions, releasable pivot means carried by said frame and said derrick and constructed and arranged to pivotally engage and support said derrick at its medial portions upon said frame during a portion of its movement through said vertical plane to horizontal overhanging position relative to the vehicle, said pivot means being movably mounted on said frame for forward shifting movement relative thereto to storage position, releasable pivot means carried by said frame and said derrick and constructed and arranged to pivotally engage and support said derrick at its lower end portions upon said frame during the remainder of its movement through said vertical plane, and means for moving said derrick in said vertical plane.

2. A derrick assembly comprising a frame, a derrick carried by said frame for swinging movement in a vertical plane and having upper and lower end portions and medial portions, releasable pivot means mounted on said frame and said derrick and constructed and arranged to pivotally engage and support said derrick at its medial portions upon said frame during a portion of its movement through said vertical plane, said pivot means being slidably mounted on said frame for controlled forward and rearward sliding movement thereon, releasable pivot means carried by said frame and said derrick at a lower elevation than said first mentioned pivot means and constructed and arranged to pivotally engage and support said derrick at its lower end portions upon said frame throughout the remainder of its movement in said vertical plane, and means for moving said derrick in said vertical plane.

3. A derrick assembly comprising a frame, a derrick carried by said frame for swinging movement in a vertical plane and having upper and lower end portions and medial portions, automatically locking and unlocking cooperative pivot means carried by said frame and said derrick and constructed and arranged to pivotally engage and support said derrick at its medial portions upon said frame during a portion of its movement through said plane, said pivot means being movably mounted on said frame for controlled forward and rearward movement thereon, releasable pivot means carried by said frame and said derrick and constructed and arranged to pivotally engage and support said derrick at its lower end portions upon said frame throughout the remainder of its movement through said plane and means for moving said derrick in said vertical plane.

4. A derrick assembly comprising a frame, a derrick carried by said frame for swinging movement in a vertical plane and having upper and lower end portions and medial portions, releasable pivot means carried by said frame and said derrick and constructed and arranged to pivotally engage and support said derrick at its medial portions upon said frame during a portion of its movement through said vertical plane, said pivot means being shiftably mounted on said frame for controlled forward and rearward movement as desired relative to the vehicle, automatically locking and unlocking cooperative means carried by said frame and said derrick and constructed and arranged to pivotally engage and support said derrick at its lower end portions upon said frame, said second mentioned pivot means being constructed and arranged to pivotally engage, support and lock the lower end portions of said derrick to said frame when the medial portions of said derrick are released by said first mentioned means as said derrick is swung in said vertical plane and to automatically unlock the lower end portions of said derrick from said frame and disengage the same as said first mentioned pivot means engages and pivotally supports the medial portions of said derrick upon said frame, and means for controllably moving said derrick in said vertical plane.

5. A derrick assembly comprising a frame, a derrick carried by said frame for swinging movement in a vertical plane and having upper and lower end portions and medial portions, automatically locking and unlocking cooperative pivot means carried by said frame and said derrick and constructed and arranged to pivotally engage and support said derrick at its medial portions upon said frame during a portion of its movement through said vertical plane, said pivot means being shiftably mounted on said frame for forward and rearward shifting movement relative thereto, automatically locking and unlocking cooperative pivot means carried by said frame and said derrick and constructed and arranged to pivotally engage and support said derrick at its lower end portions upon said frame, said first and second mentioned pivot means being constructed and arranged to pivotally engage, support and lock the medial portions of said derrick to said frame and to unlock and disengage the lower end portions of said derrick from said frame respectively as said derrick is swung past vertical position in said plane in one direction, said first and second mentioned pivot means being constructed and arranged to unlock and disengage the medial portions of said derrick from said frame and to pivotally engage, support and lock the lower end portions of said derrick to said frame respectively as said derrick is swung past vertical position in said plane in the opposite direction, and means for moving said derrick in said vertical plane.

6. A derrick assembly comprising a frame, a derrick carried by said frame for swinging movement in a vertical plane and having upper and lower end portions and medial portions, pivot means carried by said frame and said derrick and constructed and arranged to pivotally engage and support said derrick at its medial portions upon said frame during a portion of its swinging movement through said vertical plane, said pivot means being shiftably mounted on said frame for controlled movement longitudinally thereof, pivot means carried by said frame and said derrick below said first mentioned pivot means and constructed and arranged for engaging and supporting said derrick at its lower end portions throughout the remainder of its swinging movement through said vertical plane, means for automatically locking said pivot means on said frame in position directly overhead of said second mentioned means, and means for controllably swinging said derrick in said vertical plane.

7. A derrick assembly comprising a frame, a derrick carried by said frame for swinging movement in a vertical plane and having upper and lower end portions and medial portions, automatically locking and unlocking pivot means carried by said frame and derrick and constructed and arranged to pivotally engage, support and automatically lock said derrick at its medial portions upon said frame during a portion of its swinging movement through said vertical plane, said pivot means being shiftably mounted on said frame for forward and rearward movement relative thereto, automatically locking and unlocking cooperative pivot means carried by said frame and said derrick and constructed and arranged to engage, support and lock the lower end portions of said derrick to said frame during the remainder of its swinging movement in said vertical plane, said pivot means being vertically spaced relative to each other, means for releasably locking said first mentioned pivot means in position above said second mentioned means, said first mentioned pivot means automatically unlocking the medial portions of said derrick from said frame when the lower end portions of said derrick are engaged by said second mentioned means, said second mentioned pivot means automatically unlocking the lower end portions of said derrick from said frame when the medial portions of said derrick are engaged by said first mentioned means, and means for controllably swinging said derrick in said vertical plane.

8. A derrick assembly comprising a frame adapted to be mounted upon one end of a vehicle, a derrick carried by said frame for swinging movement in a vertical plane and having upper and lower end portions and medial portions, said frame having an upright portion and another portion extending longitudinally of the vehicle when so mounted, pivot means slidably mounted on said longitudinally extending portion of said frame for engaging and supporting said derrick at its medial portions during a portion of its swinging movement in said vertical plane, means for locking said pivot means adjacent the upright portion of said frame, pivot means mounted upon said upright portion of said frame adjacent its lower end and on said derrick at its lower end portions for engaging and supporting said derrick at its lower end portions throughout the remainder of its swinging movement through said vertical plane, said derrick being swingable on said first mentioned pivot means to a substantially horizontally overhanging position relative to the vehicle, said derrick and said first mentioned means being shiftable longitudinally of said frame and the vehicle when lying in said overhanging position, and means for controllably swinging said derrick in said vertical plane.

9. The combination of a vehicle, a frame mounted on said vehicle, a derrick pivotally mounted on said frame for outward swinging movement in a vertical plane and relative to said vehicle, automatically locking and unlocking cooperative pivot means carried by said frame and said derrick and constructed and arranged to pivotally engage and support said derrick at its medial portions upon said frame during a portion of its movement through said vertical plane, said pivot means being slidably mounted on said frame for movement longitudinally of the vehicle in a direction opposite to the outward swinging movement of said derrick, automatically locking and unlocking pivot means carried by said frame and said derrick and constructed and arranged to pivotally engage and support said derrick at its lower end portions upon said frame, said second mentioned pivot means automatically locking the lower end portions of said derrick to said frame as said derrick swings outwardly from the vehicle and disengages said first mentioned pivot means, said first mentioned pivot means automatically engaging and locking the medial portions of said derrick to said frame as said derrick swings inwardly toward said vehicle and said second mentioned pivot means unlocks and disengages the lower end portions of said frame, and means for controllably moving said derrick in said vertical plane.

10. A derrick assembly comprising a frame member adapted to be mounted upon one end of a vehicle, a derrick member carried by said frame member for swinging movement in a vertical plane and having upper and lower end portions and medial portions, automatically locking and unlocking pivot means carried by said frame member and said derrick member and constructed and arranged to pivotally engage, support and automatically lock said derrick member at its medial portions upon said frame member during a portion of its swinging movement through said vertical plane, and to unlock and to disengage said derrick member from said frame member during the remainder of its pivotal movement through said vertical plane, said automatic pivot means consisting of a slotted annular member mounted on one of said members and a tongue mounted on the other of said members in cooperating position relative to said annular member, said tongue being slightly thinner than the slot of said annular member and substantially equal in width to the inner diameter of said annular member, said tongue and said annular member being positioned and arranged so that the former will enter the slot of the latter when said derrick member swings toward the vehicle to a vertical position and will pivot therewithin and cooperatively interlock as said derrick member swings on past vertical position, pivot means constructed and arranged for engaging and supporting said derrick at its lower end portions throughout the remainder of its swinging movement through said vertical plane, said first mentioned means automatically unlocking the medial portions of said derrick from said frame when the lower end portions of said derrick are engaged by said second mentioned means, and means for controllably swinging said derrick in said vertical plane.

11. A derrick assembly comprising, a frame, a derrick carried by said frame for swinging movement in a vertical plane and having upper end lower end portions and medial portions, automatically locking and unlocking pivot means carried by said frame and said derrick and constructed and arranged to pivotally engage, support, and automatically lock said boom at its medial portions upon said frame during a portion of its swinging movement through said vertical plane, pivot means constructed and arranged for engaging and supporting said derrick at its lower end portions throughout the remainder of its swinging movement through said vertical plane, said first mentioned means being separate from said second mentioned means and automatically unlocking the medial portions of said derrick from said frame when the lower end portions of said derrick are engaged by said second mentioned means, and means for controllably swinging said derrick in said vertical plane, one of said pivot means consisting of a slotted annular member and a tongue member mounted on said derrick and said frame in cooperating relation, said tongue being slightly thinner than the slot in said annular member and substantially equal in width to the inner diameter of said annular member, said annular member being arranged to receive said tongue member in its slot and said tongue member being positioned and arranged to enter said slot as said derrick swings toward the vehicle to vertical position and said members thereby are brought together and to pivot therewithin as said derrick is moved on in said vertical plane beyond the vertical position to cooperatively lock said derrick and said frame together during a portion of its swinging movement in said vertical plane.

12. A derrick assembly comprising, a frame, a derrick carried by said frame for swinging movement in a vertical plane and having upper end lower end portions and medial portions, automatically locking and unlocking pivot means carried by said frame and said derrick and constructed and arranged to pivotally engage, support, and automatically lock said boom at its medial portions upon said frame during a portion of its swinging movement through said vertical plane, pivot means constructed and arranged for engaging and supporting said derrick at its lower end portions throughout the remainder of its swinging movement through said vertical plane, said first mentioned means being separate from said second mentioned means and automatically unlocking the medial portions of said derrick from said frame when the lower end portions of said derrick are engaged by said second mentioned means, and means for controllably swinging said derrick in said vertical plane, one of said pivot means consisting of a pair of interlockable rigid arcuate members carried by said frame and said derrick in cooperating relative positions during a portion of the swinging movement of said derrick in said vertical plane, one of said arcuate members being a channel member, the other of said arcuate members being positioned and arranged to enter the channel of said channel member during a portion of said swinging movement of said derrick and thereby cooperatively lock said derrick to said frame during a portion of the swinging movement of said derrick in said plane.

References Cited in the file of this patent

UNITED STATES PATENTS

| | | |
|---|---|---|
| 1,496,466 | Jackson | June 3, 1924 |
| 2,611,580 | Troche et al. | Sept. 23, 1952 |
| 2,614,802 | McGihon | Oct. 21, 1952 |
| 2,616,666 | Honey | Nov. 4, 1952 |
| 2,677,147 | Phillips | May 4, 1954 |
| 2,711,803 | Hurst | June 28, 1955 |

FOREIGN PATENTS

| | | |
|---|---|---|
| 582,030 | Great Britain | Nov. 1, 1946 |